United States Patent
Nielsen et al.

(10) Patent No.: US 9,482,207 B2
(45) Date of Patent: Nov. 1, 2016

(54) WIND TURBINE AND A METHOD OF OPERATING A WIND TURBINE

(75) Inventors: Thomas Korsgaard Nielsen, Randers SV (DK); Poul Spærhage Frøkjær, Gistrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 636 days.

(21) Appl. No.: 13/994,635

(22) PCT Filed: Dec. 15, 2011

(86) PCT No.: PCT/DK2011/050483
§ 371 (c)(1),
(2), (4) Date: Sep. 10, 2013

(87) PCT Pub. No.: WO2012/079585
PCT Pub. Date: Jun. 21, 2012

(65) Prior Publication Data
US 2013/0343888 A1  Dec. 26, 2013

Related U.S. Application Data

(60) Provisional application No. 61/423,352, filed on Dec. 15, 2010.

(30) Foreign Application Priority Data

Dec. 15, 2010 (DK) ................ 2010 70548

(51) Int. Cl.
F03D 11/00 (2006.01)
(52) U.S. Cl.
CPC ........... F03D 11/0008 (2013.01); F03D 80/70 (2016.05); F05B 2240/50 (2013.01);
(Continued)

(58) Field of Classification Search
CPC ............... F03D 11/0008; F03D 80/70; F05B 2240/50; F05B 2260/98; F05B 2270/3015; F05B 2270/701; F05B 2270/705; F05B 2270/706; F05B 2270/80; F05B 2270/704; Y02E 10/722

See application file for complete search history.

(56) References Cited

U.S. PATENT DOCUMENTS 2,539,862 A * 1/1951 Rushing .............. F03D 9/02
192/104 R
4,088,420 A * 5/1978 Jacobs ................ F03D 7/0212
416/146 A (Continued)

FOREIGN PATENT DOCUMENTS

| DK | 102007029469 A1 | 1/2009 |
| EP | 2175137 A2 | 4/2010 |
| EP | 2251566 A1 | 11/2010 |

OTHER PUBLICATIONS

European Patent Office, Official Action issued in Application No. 11 799 353.5 dated Jun. 1, 2015.
(Continued)

*Primary Examiner* — Igor Kershteyn
(74) *Attorney, Agent, or Firm* — Wood Herron & Evans LLP

(57) ABSTRACT

The invention provides a wind turbine comprising a rotatable drive train including at least one bearing (3) and a pump (4) for supply of a lubricant to the bearing (3). The wind turbine further comprises a controller for performing closed loop control of the pump (4) to provide an amount of lubricant which varies depending on an actual state of operation.

15 Claims, 2 Drawing Sheets

(52) U.S. Cl.
CPC .... *F05B2260/98* (2013.01); *F05B 2270/3015* (2013.01); *F05B 2270/701* (2013.01); *F05B 2270/704* (2013.01); *F05B 2270/705* (2013.01); *F05B 2270/706* (2013.01); *F05B 2270/80* (2013.01); *Y02E 10/722* (2013.01)

(56) References Cited

U.S. PATENT DOCUMENTS

| | | | | |
|---|---|---|---|---|
| 4,503,673 | A * | 3/1985 | Schachle | F03D 7/04 290/44 |
| 8,092,151 | B2 * | 1/2012 | Becker | F03D 9/025 415/112 |
| 8,118,542 | B2 * | 2/2012 | Damgaard | F03D 1/001 415/123 |
| 8,508,060 | B2 * | 8/2013 | Siegfriedsen | F03D 11/00 137/343 |
| 2005/0034925 | A1 * | 2/2005 | Flamang | F03D 11/0008 184/6.12 |
| 2007/0169997 | A1 | 7/2007 | Delaloye | |
| 2008/0260545 | A1 | 10/2008 | Frokjaer | |
| 2010/0135793 | A1 | 6/2010 | Krauss | |

OTHER PUBLICATIONS

International Searching Authority, Search Report and Written Opinion issued in corresponding PCT/DK2011/050483 dated May 21, 2012, 13 pages.

Danish Patent Office, DK Search and Examination Report issued in corresponding DK Application No. PA201070548 dated Jul. 12, 2011, 6 pages.

* cited by examiner

WIND TURBINE AND A METHOD OF OPERATING A WIND TURBINE

FIELD OF INVENTION

The present invention relates to a wind turbine and a method of operating a wind turbine.

BACKGROUND OF THE INVENTION

Rotating systems, including gearboxes and bearings, of wind turbines require lubrication by special lubricants.

Traditionally, an oil pump driven by constant speed supplies an amount of oil to the rotating system to ensure lubrication and cooling of different elements of the rotating system. However, due to the increasing size of modern wind turbines, e.g. having blades of up to 15 tons with a length of up to 60 meters or even larger, a constant supply of oil may result in heavy over-consumption of oil and of energy for driving the pump.

SUMMARY OF THE INVENTION

It is an object of preferred embodiments of the present invention to provide an improved wind turbine and an improved method of operating a wind turbine.

Thus, in a first aspect, the invention provides a wind turbine comprising a rotatable drive train including at least one bearing, and a pump for supply of a lubricant to the bearing, the wind turbine further comprising a controller for performing control of the pump to provide an amount of lubricant which varies depending on an actual state of operation, wherein the controller performs closed loop control.

The rotatable drive train includes at least one bearing. The at least one bearing may be e.g. a main shaft bearing, a generator bearing, or a gear bearing. In the rotatable drive train, at least one part rotates relative to another part during normal operation of the wind turbine.

The lubricant is a substance which is suitable for lubricating the moving parts of the drive train. The lubricant is preferably a liquid, such as oil. The lubricant may be applied to the main shaft, to at least one bearing, or to gear mesh pinions, etc.

The pump may be a mechanically or electrically driven pump. It may advantageously have a variable speed, thereby facilitating adjustment of the amount of lubricant supplied by the pump.

The wind turbine further comprises a controller for controlling the pump so that a variable amount of lubricant can be provided. As an example, the controller may be responsible for sending a signal which varies the pump speed and thereby the amount of lubricant provided.

The controller controls the pump so that the amount of lubricant provided varies dependent on an actual state of operation, which state of operation may e.g. be upstart of the turbine, full load operation, etc. By varying the amount of lubricant supplied, the lifetime of the pump may be extended. Furthermore, the amount of electricity used for running the pump may be decreased. It should be understood, that by pump is meant the entire pump unit including power supply, power control means, fittings, and similar features of a pump unit.

The overall efficiency of the wind turbine may also be increased, when not using unnecessary power. Another advantage is, that excessive circulation of lubricant may be avoided, thereby also avoiding foam creation in the lubricant.

In wind turbine operation several operational parameters depend on weather conditions which are of course difficult to predict and sometimes even difficult to determine. Accordingly, the controller offers the opportunity in a wind turbine to counteract loads which occurs as a result of changing weather condition.

The controller performs closed loop control. I.e. a chosen controlling parameter may be measured and/or sensed and subsequently fed back to the controller so that the amount of lubricant supplied may be decreased or increased based on the difference between the measured/sensed feedback value and the input value of the controlling parameter. It should be understood, that the chosen parameter used as feedback value need not be a single parameter, but may be a set of parameters used together.

Accordingly, the parameter which is fed back to the controller could be one or more of the parameters referred to later when the describing a transfer function for the closed loop. I.e. the parameters could be one of or a combination of two or more of: a rotational speed of an element of the drive train, a lubricant level in a sump, a differential pressure over a filter, power production, one or more pressure values, one or more temperatures, humidity, wind speed, and loading of the drive train.

As the wind turbine may further comprise a gearbox, the pump may further be adapted to supply lubricant to the gearbox. The amount of lubricant supplied may depend on the actual state of operation as described above.

The controller may be a proportional (P), a proportional integral (PI), a proportional differential (PD), or proportional integral differential (PID) controller. The controller may be chosen based on e.g. the size of the wind turbine, and/or the site at which the turbine is positioned, as the expected load for the wind turbine may depend on the selected site. The controller may as an example use a mathematical transfer function or a look-up table.

The drive train may comprise at least one sensor for sensing operational conditions. The sensor(s) may communicate with the controller to facilitate control of the pump. As an example, the communication may be wireless.

In order to assure a sufficient amount of lubricant to the bearing(s) and/or gearbox, the actual state of operation may comprise at least one of lubrication need and cooling need.

The lubrication need may e.g. be dependent on the rotational speed of the drive train, the load of the wind turbine, the number and size of bearings, the size of the gearbox, etc.

During lubrication of the rotatable drive train, the temperature of the lubricant is normally increased because rotating parts produce heat. The lubricant may therefore also to some extent be used for cooling the rotating parts. Thus, the actual state of operation may comprise the cooling need.

The wind turbine may further comprise at least a second pump being adapted to provide a constant amount of lubricant. Thus, the second pump may e.g. be used to provide a primary amount of lubrication, whereas the pump previously described may be used to provide an additional amount so that the total amount of lubricant provided varies dependent on the actual state of operation.

The gearbox may include a sump, and the amount of lubricant may depend on a level in the sump. It should be understood, that by sump is meant a reservoir of lubricant. The sump may be integrated in the gearbox or may alternatively be an external reservoir.

As an example, the drive train may be lubricated according to a 'dry sump method', i.e. lubricant may be drawn out of the gear system and stored in the reservoir. This has the advantage that less friction occurs as a result of the lubrication process, thereby reducing the losses introduced in the gear system and improving the efficiency of the gear system.

Furthermore, the risk of fouling the interior parts of the gear system is reduced due to the smaller amount of lubricant being present in the gear system. Finally, the temperature of the moving parts of the gear system, notably the gear teeth, is reduced, since the moving parts are not submerged in relatively hot lubricant.

In another embodiment, the drive train may be lubricated according to a 'wet sump method', i.e. a larger amount of lubrication is present in the gear system.

In a further alternative embodiment, it may be thereby possible to switch between a 'dry sump mode' and a 'wet sump mode'. Thus, the gearbox may be operated in at least two modes, one with dry sump and one with wet sump. The amount of lubricant provided may depend on the level in the sump.

The wind turbine may further comprise a filter for filtering the lubricant. The amount of lubricant provided may depend on a differential pressure over the filter. As an example, it may be an advantage if the pump during start up is running slowly to avoid that the filter is blocked. Furthermore, a low differential pressure may indicate that the filter is partly blocked and it may thus be an advantage to let the pump run slowly to avoid that particles are released from the filter.

A transfer function of the controller may be a function of one or more controlling parameters selected from a group consisting of: a rotational speed of an element of the drive train, a lubricant level in a sump, a differential pressure over a filter, power production, one or more pressure values, one or more temperatures, humidity, wind speed, and loading of the drive train. I.e. one or more controlling parameters may be measured and/or sensed and subsequently fed back to the controller so that the amount of lubricant supplied may be decreased or increased based on the difference between the measured/sensed feedback value of the controlling parameter(s) and the requested value of the controlling parameter(s). The controlling parameter(s) may be selected based on the actual state of operation, as it may be an advantage to change between different controlling parameter(s) during operation of the wind turbine.

The pressure values may e.g. be a pump pressure, a lubrication pressure, or another pressure value in the lubrication circuit.

In one embodiment, the controlling parameters are collected in one single controller. As an example, his may be done by weighing the controlling parameters by a set of weight distribution factors. The weight distribution factors may be dependent on the actual state of operation so that they may change during operation of the wind turbine.

The at least one controlling parameter may be recorded in a time-step. The controller may then perform control based on more values of the controlling parameters obtained in the time-step. In this way, the lubrication may be carried out based on an average of the controlling parameter or based on a maximum or minimum value of the controlling parameter within the time-step.

Several different controlling parameters can be monitored within a time-step, and the lubrication can be provided based on a result of the monitoring. In this process, one of the controlling parameters may influence the importance or strength of the other controlling parameters. As an example, wind conditions may be monitored simultaneously with temperature. If the temperature is high, the lubrication may be changed more aggressively based on the wind speed, etc.

In another example, the lubrication is a function of wind speed, and wind conditions are monitored in a time-step. If the deviation between the average wind speed and the maximum or minimum wind speed within the time-step is large, then lubrication controlled more aggressively as a function of the wind speed which leads to a larger change of lubrication for a change in wind speed.

The controller may perform control according to a pre-specified sequence, i.e. if the controlling parameter(s) is/are within a pre-specified range, a pre-specified amount of lubricant may be provided and subsequently in a following sequence another pre-specified amount may be provided. In one embodiment, the amount of lubricant provided in a first sequence is less that the amount of lubricant provided in a following sequence. As an example, this may be the case in connection with upstart of the wind turbine after a stand still period. When starting the wind turbine it may be an advantage to provide a smaller amount of lubricant, e.g. to ensure that one or more filters are not blocked. When the wind turbine is running and the start up period has terminated, the amount of lubricant provided may be increased.

In order to protect the drive train, the controller may comprise a fail safe function which may interrupt rotation of the drive train upon detection of insufficient lubricant.

In a second aspect, the invention provides a method of operating a wind turbine comprising a rotatable drive train including at least one bearing, and a pump for supply of a lubricant to the bearing, the method comprising the following steps:
providing a controller,
recording the supply of the lubricant, and
performing a control of the pump to provide an amount of lubricant which varies depending on an actual state of operation, the control being a closed loop control.

It should be understood, that the above-mentioned features of the first aspect of the invention may also be applicable in relation to the method of operating a wind turbine according to the second aspect of the invention. Thus, the second aspect may comprise any combination of features and elements of the first aspect of the invention.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
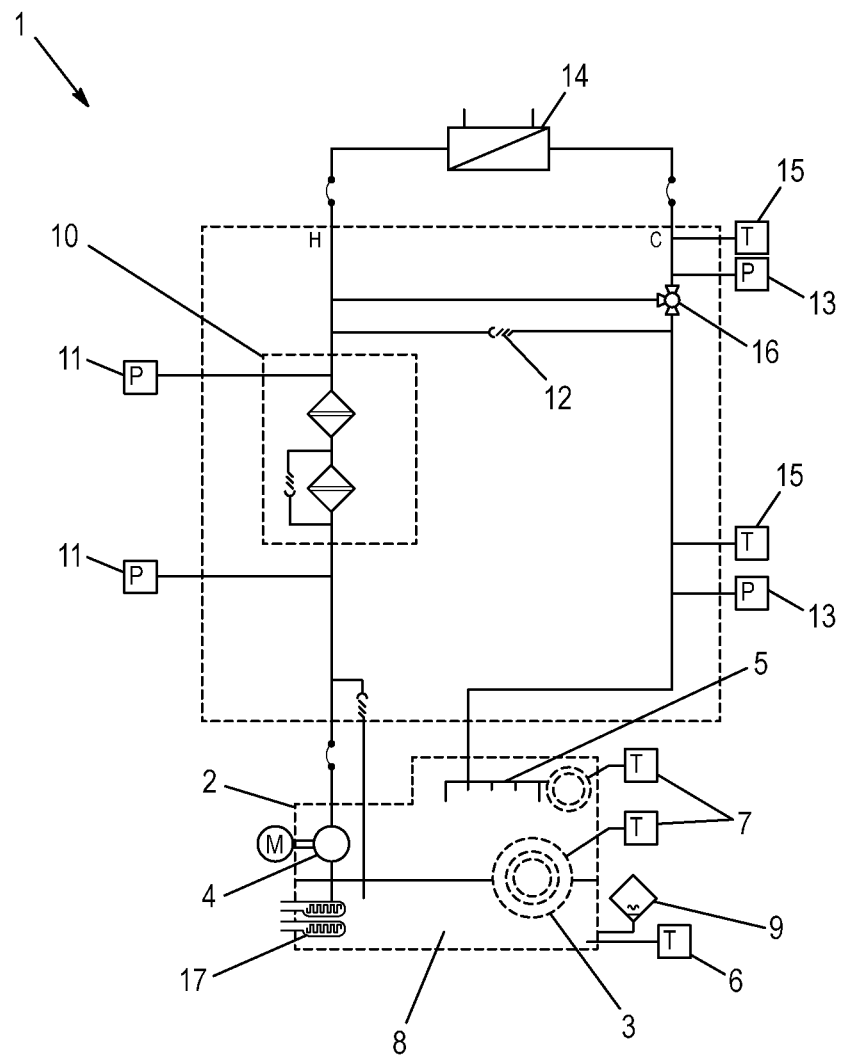
FIG. 1 is a diagrammatically illustration of lubrication system according to an embodiment of the invention.

FIG. 1 is a diagrammatic view of a lubrication system 1 according to an embodiment of the invention. The wind turbine (not shown) comprises a rotatable drive train including a gearbox and bearing arrangement 2. As illustrated, the drive train comprises a bearing 3 and a pump 4 for supply of a lubricant to the bearing 3.

The wind turbine further comprises a controller (not shown) for performing control of the pump 4 to provide an amount of lubricant which varies depending on an actual state of operation of the wind turbine.

The gearbox and bearing arrangement 2 comprises a lubrication distribution arrangement 5 to ensure proper distribution of the lubricant to the bearing(s), the gearbox, and different consumers in the gearbox dependent on the actual state of operation. As the amount of lubricant supplied can be varied dependent on one or more temperatures, the gearbox and bearing arrangement 2 further includes a lubricant temperature sensor 6 and two bearing temperature sensors 7.

The gearbox and bearing arrangement 2 further comprises a sump 8, i.e. a reservoir of lubricant, and a level measuring unit 9 for measuring the amount of lubricant in the sump 8, thereby facilitating supply of lubricant dependent on the level in the sump 8.

The wind turbine further comprises a filtration unit 10 with a filter for filtering the lubricant. In the illustrated embodiment, the filtration unit 10 includes two pressure sensors 11 which may be used to provide an amount of lubricant which varies on an actual state of operation, as the amount supplied may depend on a differential pressure over the filter.

Furthermore, the wind turbine comprises a by-pass valve 12 which together with the pressure sensors 13 may be used to by-pass an amount of lubricant in case of overpressure in the system.

A heat exchanger 14 is provided to enable cooling of the lubricant in case the temperature hereof is too high. Temperature sensors 15 are provided on both sides of a thermo valve 16.

The thermo valve 16 is used to allow fluid flow of a part of the lubricant though the heat exchanger 14 whereas the rest of the lubricant flows in parallel which the heat exchanger 14. During some states of operation, the total amount of lubricant will flow through the heat exchanger 14 to ensure sufficient cooling hereof.

The gearbox and bearing arrangement 2 comprises a heating device 17 which can be used to heat the lubricant in case of a too low temperature hereof, e.g. during upstart of the wind turbine during wintertime.

A transfer function of the controller (not shown) is a function of one or more controlling parameters, such as: a rotational speed of an element of the drive train, a lubricant level in a sump 8, a differential pressure over a filter in a filter unit 10, power production, one or more pressure values P, one or more temperatures T, humidity, wind speed, and loading of the drive train. I.e. one or more controlling parameters may be measured and/or sensed by different sensors 6, 7, 9, 11, 13, 15, and subsequently fed back to the controller so that the amount of lubricant supplied may be decreased or increased based on the difference between the measured/sensed feedback value of the controlling parameter(s) and the requested value of the controlling parameter(s).

The invention has been explained with reference to a wind turbine comprising a rotatable drive train including a gear system, as it is highly relevant for gearbox lubrication purposes. It should however be understood, that the present invention may also be used in connection with a lubrication system for a gearless wind turbine, i.e. a lubrication system for lubrication of at least one bearing of the rotatable drive train.

Figure 2:
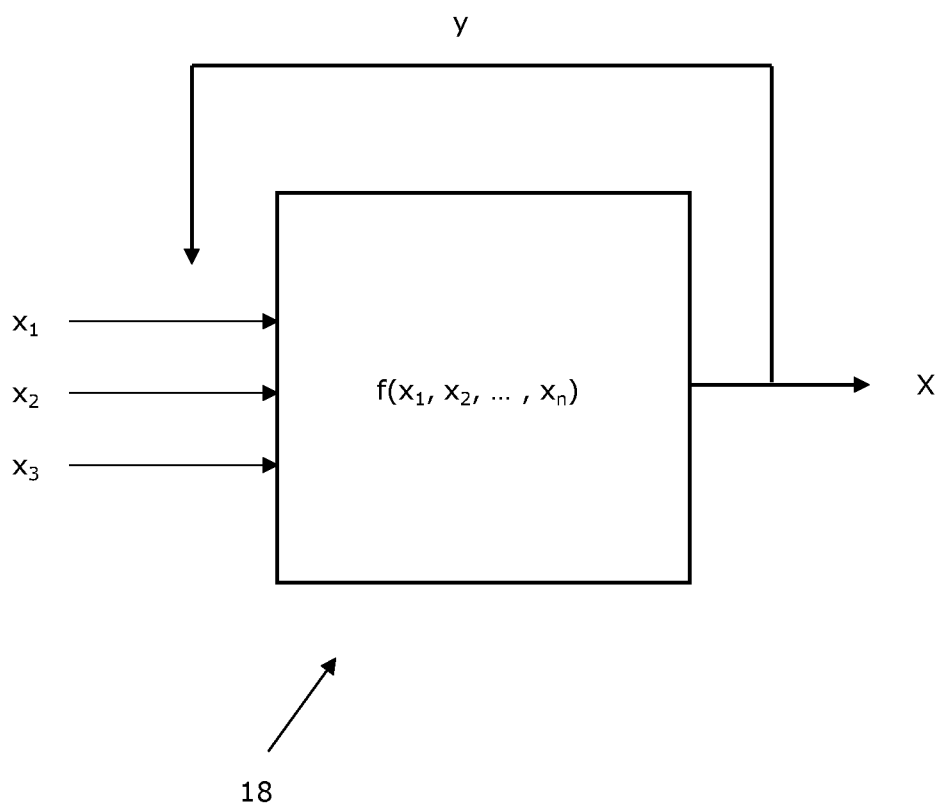
FIG. 2 is a diagram illustrating an embodiment of the control system.

FIG. 2 is a diagrammatically illustration of an embodiment of the controller 18 for performing control of the pump (see FIG. 1) to provide an amount of lubricant which varies depending on an actual state of operation.

The transfer function f of the controller 18 is a function of different parameters $x_1, x_2, \ldots, x_n$. The controlling parameters x may be one or more of the following: a rotational speed of an element of the drive train, a lubricant level in a sump, a differential pressure over a filter, power production, one or more pressure values, one or more temperatures, humidity, wind speed, and loading of the drive train. The output X is a controlling parameter for the pump, such a frequency or control voltage for controlling the pump to provide an amount of lubricant which varies depending on an actual state of operation.

One or more of the controlling parameters $x_1, x_2, \ldots, x_n$ are measured and/or sensed and the measured/sensed value y is subsequently fed back to the controller so that the amount of lubricant supplied can be decreased or increased based on the difference between the measured/sensed feedback value y of the controlling parameter(s) and the input value of the controlling parameter(s) $x_1, x_2, \ldots, x_n$.

In the present embodiment, the measured/sensed value y is a common controlling parameter which is calculated by weighing the controlling parameters x by a set of weight distribution factors. The weight distribution factors are dependent on the actual state of operation so that they may change during operation of the wind turbine.

In an alternative embodiment, each of the controlling parameters are measured/sensed and fed back to the controller.

The controlling parameter(s) $x_1, x_2, \ldots, x_n$ can be selected based on the actual state of operation, as it is an advantage to change between different controlling parameter(s) during operation of the wind turbine.

The invention claimed is:

1. A wind turbine comprising:
a rotatable drive train including at least one bearing,
a gearbox, and
a pump for supply of a lubricant to the bearing and/or the gearbox,
the wind turbine further comprising a controller for performing control of the pump to provide an amount of lubricant which varies depending on an actual state of operation, wherein the controller performs closed loop control, and
wherein the gearbox includes a sump, and the amount of lubricant depends on a level in the sump.

2. The wind turbine according to claim 1, wherein the controller is a P, PI, PD, or PID controller.

3. The wind turbine according to claim 1, wherein the actual state of operation comprises at least one of lubrication need and cooling need.

4. The wind turbine according to claim 1, further comprising at least a second pump being adapted to provide a constant amount of lubricant.

5. The wind turbine according claim 1, wherein the gearbox can be operated in at least two modes, one with dry sump and one with wet sump.

6. The wind turbine according to claim 1, further comprising a filter for filtering the lubricant, and wherein the amount of lubricant depends on a differential pressure over the filter.

7. The wind turbine according to claim 1, wherein a transfer function of the controller is a function of one or more controlling parameters selected from a group consisting of: a rotational speed of an element of the drive train, a lubricant level in a sump, a differential pressure over a filter, power production, one or more pressure values, one or more temperatures, humidity, wind speed, and loading of the drive train.

8. The wind turbine according to claim 7, wherein the controlling parameters are collected in one single controller.

9. The wind turbine according to claim 7, wherein the at least one controlling parameter is adapted to be recorded in a time-step, and the controller performs control based on more values of the controlling parameters obtained in the time-step.

10. The wind turbine according to claim 1, wherein the controller performs control according to a pre-specified sequence, and wherein the amount of lubricant provided in a first sequence is less that the amount of lubricant provided in a following sequence.

11. The wind turbine according to claim 1, wherein the lubricant is applied to a main shaft or to at least one bearing.

12. The wind turbine according to claim 1, wherein the controller comprises a fail safe function interrupting rotation of the drive train upon detection of insufficient lubricant.

13. A method of operating a wind turbine comprising:
a rotatable drive train including at least one bearing,
a gearbox including a sump, and
a pump for supplying a lubricant to the bearing and/or the gearbox, the method comprising:
  providing a controller,
  recording the supply of the lubricant, and
  performing a control of the pump to provide an amount of lubricant which varies depending on an actual state of operation, the control being a closed loop control, wherein the amount of lubricant depends on a level in the sump.

14. A wind turbine comprising:
a rotatable drive train including at least one bearing,
a first pump for supplying a lubricant to the bearing,
a second pump for supplying a lubricant to the bearing independent of the first pump, the first pump being adapted to supply a variable amount of lubrication to the bearing and the second pump being adapted to supply a constant amount of lubrication to the bearing; and
a controller for performing control of the first pump to provide an amount of lubricant which varies depending on an actual state of operation, wherein the controller performs closed loop control.

15. A method of operating a wind turbine comprising:
a rotatable drive train including at least one bearing,
a first pump and a second pump independent of the first pump, each pump for supplying a lubricant to the bearing, the method comprising:
  providing a controller operatively coupled to the first and second pumps,
  using the first pump to provide a variable amount of lubricant to the bearing,
  using the second pump to provide a constant amount of lubricant to the bearing,
  recording the supply of the lubricant, and
  performing a control of the first pump to provide an amount of lubricant which varies depending on an actual state of operation, the control being a closed loop control.

* * * * *